United States Patent [19]

Ash et al.

[11] 4,094,356
[45] June 13, 1978

[54] GEOTHERMAL HEAT RECOVERY SYSTEM

[76] Inventors: Whewell Frank Ash, 1095 Capital Hill, Reno, Nev. 89502; Frank Robert Ash, 834 Shriver Blvd., Sparks, Nev. 89403

[21] Appl. No.: 757,379

[22] Filed: Jan. 6, 1977

[51] Int. Cl.² .................................... F28D 15/00
[52] U.S. Cl. ..................................... 165/39; 60/641; 122/33; 165/45; 165/105
[58] Field of Search .................... 165/45, 105, 39; 60/641; 122/33

[56] References Cited

U.S. PATENT DOCUMENTS

| | | | |
|---|---|---|---|
| 3,274,769 | 9/1966 | Reynolds | 165/45 X |
| 3,470,943 | 10/1969 | Van Huisen | 60/641 X |
| 3,771,590 | 11/1973 | Best et al. | 165/45 X |
| 3,857,244 | 12/1974 | Faucette | 60/641 |
| 3,911,683 | 11/1975 | Wolf | 165/45 X |
| 3,945,433 | 3/1976 | Koula | 122/33 X |

FOREIGN PATENT DOCUMENTS

| | | | |
|---|---|---|---|
| 1,137,909 | 1/1957 | France | 60/641 |
| 2,410,583 | 9/1975 | Germany | 60/641 |

*Primary Examiner*—Albert W. Davis, Jr.
*Attorney, Agent, or Firm*—Harris Zimmerman

[57] ABSTRACT

A system for recovering heat from a geothermal well includes a quantity of heavy drilling mud filling the bottom of the geothermal well. A hollow heat absorber is disposed within the drilling mud in the well bottom. The heat absorber is supplied with a working fluid such as freon through a supply pipe extending from the top of the well, the pressure head of the working fluid at the heat absorber being commensurate with the depth of the well. A high pressure gas delivery pipe extends from the heat absorber to the top of the well, and is connected to a heat exchanger disposed within a water boiler. The outlet of the heat exchanger is connected to a working fluid supply tank, which is connected in turn to the upper end of the supply pipe. A thermostatic valve interposed between the supply tank and the supply pipe controls the amount of working fluid entering the heat absorber in accordance with the temperature and heat demands of the water boiler. The amount of working fluid in the heat absorber is computed to fill the absorber to the proper height for efficient heat transfer. The working fluid vaporizes in the heat absorber at a pressure equal to the pressure head of the supply pipe, and the pressure and temperature of that vapor causes the vapor to rise at a very high rate and disperse its latent heat into the water boiler.

5 Claims, 1 Drawing Figure

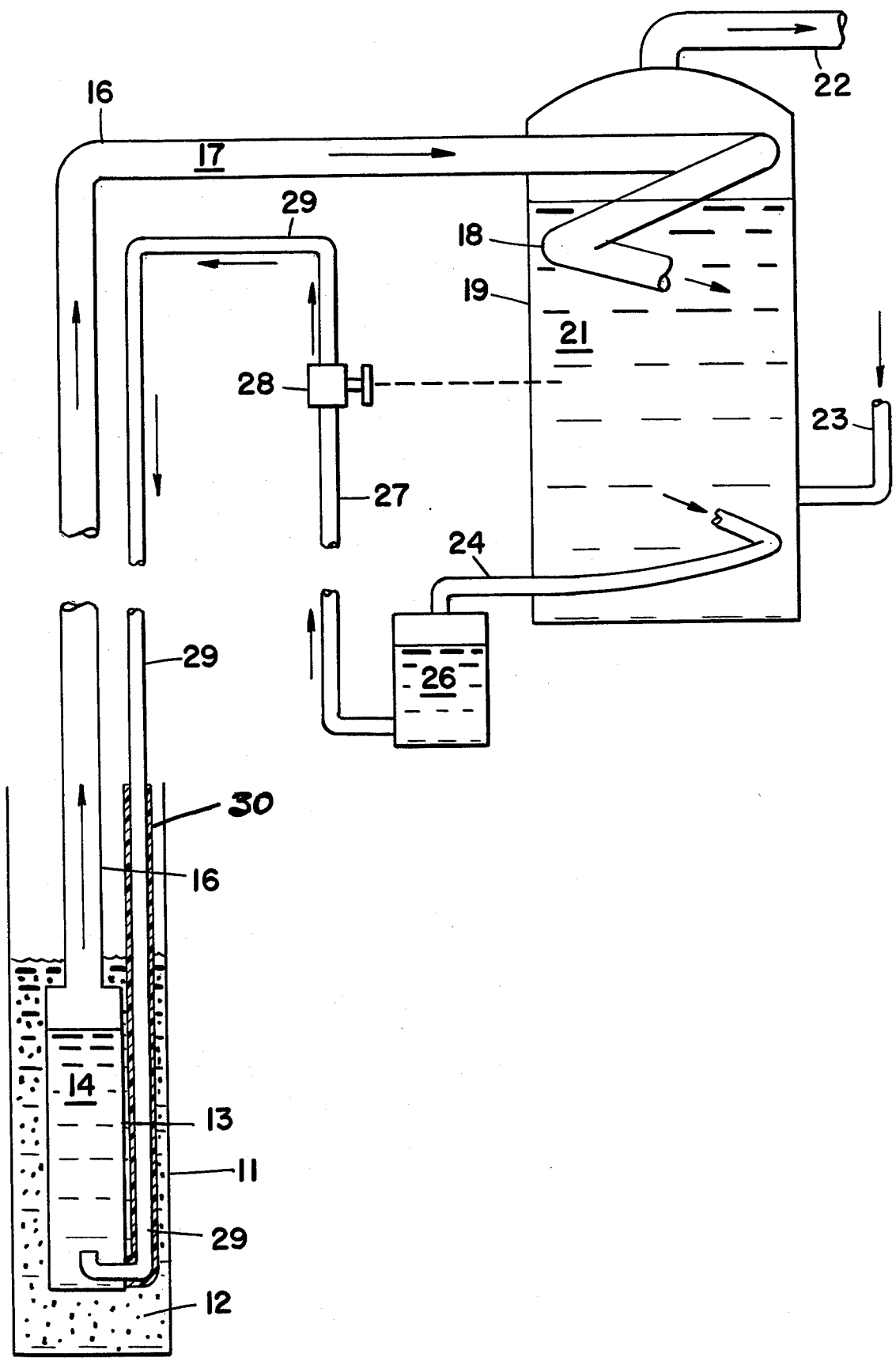

GEOTHERMAL HEAT RECOVERY SYSTEM

BACKGROUND OF THE INVENTION

In a society in which energy consumption is directly related to economic and material well-being, it is becoming increasingly evident that the cost of energy, both in environmental and fiscal terms, is a foremost limiting economic factor. For example, as petroleum based energy sources dwindle and become more expensive, increasing consideration is given to the use of coal and nuclear fission generated power. The damage that might be done to the ecosphere in exploiting these latter energy sources, as well as the cost in developing these sources, may well prove to be an insurmountable burden.

One energy source which has been known for years but which has been relatively undeveloped is geothermal power. It has been calculated that the latent heat within the earth itself is sufficient to meet all of the energy needs of all of civilization for centuries to come. However, the methods developed for retrieving geothermal energy are relatively unsophisticated and relatively unsuccessful. The following patents exemplify the state of the art in recovering geothermal energy:

3,857,244   3,911,683
3,903,700   3,957,108
3,908,381

The oldest and most obvious method of recovering geothermal energy is to inject water into heat-bearing rock strata and to recover the steam generated in this process. It has been found, however, that recovering steam from rock strata is not an easy task. Furthermore, the steam often carries corrosive elements such as sulphates, mineral contamination, and the like, which must be removed from the steam before it can be used in a working apparatus. Furthermore, the water injecting pipes and the steam recovery manifolds are subject to corrosion and have a very short operational life.

Another method of recovering geothermal heat is to place a passive heat conducting pipe into a geothermal well. The upper end of the pipe extends into a heat recovery system such as the water boiler, thereby overcoming the corrosion and contamination problems of water injection systems. The major drawback of such a passive heat transfer system is that the heat transfer capacity is very limited; also, it is difficult to arrange such a passive heat transfer system to respond immediately to increased energy demands, due to the thermal inertia of the heat transfer pipe.

Another geothermal energy recovery technique involves the use of a working fluid in a closed cycle. In such systems, the working fluid is pumped to the well bottom where it absorbs latent geothermal heat. The pumping action then drives the working fluid to the earth's surface, where it is pumped through a heat exchanger such as a water boiler or the like, thence through a condenser and then back into the well. In such prior art systems, the working fluid may be water, or carbon dioxide. In either case, the use of pumps to move the working fluid, together with the use of vapor condensers, preheating heat pumps, and the like, requires a very extensive and expensive apparatus. Thus, the potentially free energy provided by geothermal heat is made quite costly.

SUMMARY OF THE INVENTION

The present invention generally comprises a geothermal energy recovery system in which a working fluid is maintained in a closed cycle. The closed cycle includes a heat absorber at the bottom of the geothermal well, a heat exchanger within a water boiler or similar working device at the top of the well, and a supply tank interposed between the heat exchanger and the supply pipe. In this extremely simplified closed cycle system, the working fluid acts as its own pumping agent, and no vapor condenser is required.

The heat abosrber of the present invention is disposed at the bottom of the geothermal well, and is surrounded by a quantity of heavy drilling mud. The drilling mud protects the heat absorber from the corrosive action of geothermal vapors, acids, and the like. Extending upwardly from the heat absorber is a high pressure gas delivery pipe which is connected in turn to the input side of the heat exchanger. The output of the heat exchanger is connected to a working fluid supply tank. The supply tank is connected through a thermostatic valve to a supply pipe extending down into the well to the heat absorber.

It may be appreciated that the long supply pipe extending down into the well creates a rather high pressure head for the working fluid. The amount of working fluid entering the supply pipe and flowing into the heat absorber is controlled by the thermostatic valve, which senses the heat requirements within the water boiler. The working fluid, which may be a freon compound of predetermined density and boiling point, is quickly vaporized within the heat absorber and becomes a high temperature, high pressure gas. The hot gas has a very low density and rises quickly in the delivery pipe. The majority of the heat content of the gas entering the heat exchanger from the delivery pipe is in the heat of vaporization of the gas, and this heat is given up to the water boiler or the like as the hot gas condenses back into a liquid. The liquid then drains from the heat exchanger into the working fluid supply tank.

BRIEF DESCRIPTION OF THE DRAWING

The FIGURE is a schematic representation of the geothermal heat recovery system of the present invention.

DESCRIPTION OF THE PREFERRED EMBODIMENT

The geothermal heat recovery system of the present invention is intended for use with a geothermal well 11 as shown in the accompanying FIGURE. Disposed within the well 11 is a quantity of drilling mud 12 or similar inert heat conductive substance. Disposed within the drilling mud 12 is a heat absorber 13. The heat absorber contains a quantity of working fluid 14. The working fluid 14 may comprise freon or a similar substance. The working fluid 14 is selected to have a low boiling point and a rather low vapor pressure. For example, in a thermal well having an ambient temperature of approximately 500° F, the working fluid would be selected to have a boiling point of 70° F. When heated to 150° F, such a working fluid would have a pressure of only 40 pounds per square inch. It may be appreciated that the heat absorber of the present invention is thus a rather low pressure device.

Extending upwardly from the heat absorber 13 is a gas delivery pipe 16. This pipe 16 carries the hot gas 17 which is generated in the heat absorber 13. The delivery pipe 16 connects to a heat exchanger 18, which is disposed within a heat recovery device 19. The heat recovery device 19 may comprise a water boiler which is filled with a quantity of water 21, or any similar device known in the art. The steam generated in the device 19 is delivered by a header 22 to a working device such as heating apparatus, turbine, or the like. Returned condensate or refill water enters the device 19 through a refill pipe 23.

The output 24 of the heat exchanger is connected to a working fluid supply tank 26, in which a quantity of working fluid is maintained. A feed pipe 27 connectes the supply tank 26 with a thermostatic valve 28. The sensor of the thermostatic valve is coupled to the recovery device 19, and the thermostatic valve 28 releases working fluid to the heat absorber in response to falling temperatures within the heat recovery device. A supply pipe 29 extends from the thermostatic valve 28 down into the geothermal well, and connects with the heat absorber 14.

It may be appreciated that the circuit through which the working fluid travels is completely closed, and that there are no pumps, expansion valves, check valves, injection valves, heat pumps, or the like which operate on the working fluid. The only valve in the system is the thermostatic valve 28.

The substantial liquid pressure head generated by the working fluid in the pipe 29 dictates that the heat absorber 14 operates under pressure. For example, the approximate pressure within the heat absorber disposed in a 1000 foot well is 657 pounds per square inch. To maintain this pressure head, the supply pipe 29 is insulated throughout its extent within the geothermal well. The insulation 30 prevents the working fluid from picking up heat as it transits down the pipe 29, so that the fluid cannot expand and lose density. Thus the pressure head provided by the pipe 29 and the delivery rate of the working fluid through that pipe is relatively constant.

As shown in the accompanying FIG., the heat absorber 13 is a rather elongated upwardly extending structure. It may be appreciated that the level of the working fluid 14 within the heat absorber determines the amount of working fluid contacting the surface of the heat absorber and thus the rate of gas generation within the absorber. The working fluid level within the absorber is determined by the difference between the boil-off rate of the working fluid and the supply rate through the supply pipe 29. The supply rate is finally controlled by the thermostatic valve 28, so that the working fluid level within the absorber 13 may easily be controlled. As the working fluid level relates directly to the rate of gas generation, the thermostatic valve 28 thus controls the rate at which the gas 17 is generated within the geothermal well. Also, the amount of heat delivered from the well is directly proportional to the rate of gas delivery from the heat absorber. Thus, the thermostatic valve 28 controls the entire functioning of the geothermal heat recovery system of the present invention.

It should be noted that all of the geothermal heat recovered by the present invention is delivered to the heat absorber 13 through the heavy drilling mud 12. The drilling mud also serves to hold in place the substrata which define the well bottom, and to insulate the heat absorber and the lower end of the supply pipe 29 from the corrosive effects of the subterranean steam, acids, and the like.

The gas 17 generated within the heat absorber rises quickly up the delivery pipe 16, due to its low density and inherent pressure. This gas 17 enters the heat exchanger 18 where it gives off its latent heat of vaporization to the relatively cooler water 21 within the heat recovery device 19. It is significant to note that most of the heat carried by the working fluid 14 and the vapor 17 is accounted for by the heat of vaporization of the working fluid. As the hot gas 17 condenses and reforms as a liquid within the heat exchanger 18, the temperature of the gas and the condensed liquid is approximately the same. The temperature of the working fluid at the outlet 24 of the heat exchanger is also approximately the same as the temperature of the hot gas 17 at the input of the heat exchanger.

It should be noted that the diameters of the pipes 27, 29, and 16 must be determined so that the flow rates therein will match the heat capacity of the system. This heat capacity is dependent also on the temperature of the geothermal well, this distance between the heat recovery device 19 and the geothermal well 11, and the heat requirements of the ultimate energy user. Further, it may be required that the delivery pipe 16 be insulated from the top of the geothermal well to the input of the heat exchanger.

It is also within the scope of the present invention to substitute various other heat sources for the geothermal well. For example, solar heating panels using a similar working fluid could be employed. In such a case, the working fluid supply tank 26 would be disposed above the solar panels to provide sufficient pressure head thereto.

We claim:

1. A geothermal heat recovery device, comprising a heat absorber containing a variable quantity of working fluid, said heat absorber being disposed within a hot zone of a geothermal well, a gas delivery pipe extending from said heat absorber out of said well, heat exchanger means connected to said gas delivery pipe for condensing the gas from said delivery pipe to liquid and conducting heat therefrom, reserve tank means connected to the output of said heat exchanger means for storing a reserve quantity of said working fluid, a supply pipe extending from said reserve tank means down said well to said heat absorber to supply said working fluid thereto, said supply pipe being substantially full of said working fluid in liquid phase to create a substantial pressure head in said heat absorber, insulation means surrounding said supply pipe for the entire portion thereof within said well for limiting the heating and expansion of and preventing vaporization of said working fluid within said supply pipe, and thermostatic valve means including a sensing element operatively associated with the operating temperature of said heat means interposed between said reserve tank means and said supply pipe for selectively controlling the feed rate of said working fluid to said heat absorber.

2. The geothermal heat recovery system of claim 1, further including a quantity of inert, heat conductive material disposed within said well and surrounding said heat absorber.

3. The geothermal heat recovery system of claim 1, wherein said heat absorber includes a hollow cavity for containing said quantity of said working fluid, said thermostatic valve means also selectively controlling the level of said quantity of said working fluid.

4. The geothermal heat recovery system of claim 1, wherein said working fluid comprises a FREON-type refrigerant having a low boiling point and a low vapor pressure.

5. The geothermal heat recovery system of claim 1, wherein said heat exchanger means includes a spiral heat exchanger containing said gas and said working fluid and disposed within a heat recovery medium.

* * * * *